United States Patent [19]

Schultz

[11] Patent Number: 4,991,746

[45] Date of Patent: Feb. 12, 1991

[54] MODULAR PUMP HAVING A LOCKING ROTATABLE SLEEVE

[75] Inventor: Robert S. Schultz, Old Greenwich, Conn.

[73] Assignee: Emson Research Inc., Bridgeport, Conn.

[21] Appl. No.: 375,050

[22] Filed: Jul. 7, 1989

[51] Int. Cl.[5] .................... G01F 11/36

[52] U.S. Cl. .................... 222/321; 222/378; 222/384; 222/387

[58] Field of Search .................... 222/320, 321, 383, 384, 222/385, 387, 372, 375, 378

[56] References Cited

U.S. PATENT DOCUMENTS

| | | | |
|---|---|---|---|
| 3,422,996 | 1/1969 | Lipman | 222/384 X |
| 3,500,761 | 3/1970 | Clevenger et al. | 222/384 X |
| 3,583,605 | 6/1971 | Corsette | 222/383 |
| 4,057,176 | 11/1977 | Horvath | 222/383 X |
| 4,273,268 | 6/1981 | Wickenberg | 222/383 X |
| 4,435,135 | 3/1984 | Knickerbocker | 222/383 X |
| 4,867,347 | 9/1989 | Wass et al. | 222/384 X |

*Primary Examiner*—Andres Kashnikow
*Assistant Examiner*—Kenneth DeRosa
*Attorney, Agent, or Firm*—Kenyon & Kenyon

[57] ABSTRACT

An improved modular lotion pump for dispensing personal products such as lotions, creams, etc., and a method of assembling same is disclosed. The modular pump is formed of several subassemblies that are subsequently assembled to form the modular pump assembly. A cap having means for attachment to a container from which material is to be dispensed may be snap fit onto the modular pump. The pump includes a rotatable locking sleeve for preventing leakage even if the container is squeezed or stepped upon by a consumer and for changing the orientation of the actuator. The actuator may be rotated relative to the locking sleeve to prevent accidental dispensing.

19 Claims, 7 Drawing Sheets

MODULAR PUMP HAVING A LOCKING ROTATABLE SLEEVE

BACKGROUND OF THE INVENTION

This invention relates generally to pumps for dispensing personal products and, more particularly, to an improved lotion pump.

Pumps that are capable of dispensing relatively large amounts of viscous materials, such as lotions, creams, soaps and the like, are commonly referred to as lotion pumps. Similar types of pumps, which are characterized by the ability to dispense relatively large quantities of material as compared to dispensing pumps that only dispense a small, typically atomized, amount of material, can also be used in applications for dispensing a wet spray or stream of a less viscous liquid, e.g., household cleaners and the like.

Dispensing pumps of this type include a housing forming a pump chamber in which a piston is disposed for reciprocal movement. At the inner end of the pump chamber an inlet valve is provided, which is closed during dispensing and opens to refill the pump chamber on the return stroke. The most typical type of inlet valve is a ball check valve. An outlet valve is formed in the area of the piston and opens during dispensing to permit the outflow of material through an actuator spout as the actuator is depressed to move the piston inwardly in the pump chamber, and, thus, to dispense the fluid material.

Pumps of this nature in the past have suffered from various drawbacks, such as difficulty in manufacture and leakage under different conditions of use. Thus, there is a need for an improved pump of this nature, which is easy to manufacture, can be used in a variety of different applications, and is not subject to leakage when used, and even abused, by a consumer.

SUMMARY OF THE INVENTION

The lotion pump of the present invention fills this need by providing a number of advantages over those of the prior art. The present invention employs an inlet ball check valve assembly in which the valve housing and valve seat may be integrally formed with the bottom of the pump housing. A ball valve member is retained between the valve seat and the return spring. The ball travel is restricted by the inner diameter of the return spring, which is smaller than the outer diameter of the ball. Optionally, a separate cage for retaining the ball of the inlet ball check valve assembly may be provided. This option enables construction of the check valve assembly as a separate subassembly. The pump utilizes a two piece actuator stem assembly having an outer or top stem and a inner or bottom stem. The piston is retained between the outer and inner stems. Surrounding the outer end of the outer stem is a locking sleeve, which is snap fit into the pump housing. The dispensing spout is formed in an actuator mounted on the outer end of the outer stem. The actuator used may be a lotion nozzle for dispensing lotions, creams, soaps, etc., or a spray actuator provided with a break-up insert or the like for dispensing a wet spray or stream of less viscous liquid.

The pump of the invention is designed as a modular pump, which greatly facilitates use of automatic assembly because of a construction that permits the preassembly of various subassemblies. The subassemblies then are assembled together into a pump module that may be shipped separately and can be used with different types of mounting caps, e.g., screw, crimped, etc. The assembly sequence of the modular pump of the invention may be as follows. In a first assembly machine, the outer stem is inserted in a central opening in the piston and the inner stem is pressed onto the inner end of the outer stem to hold the piston in place and form a first subassembly or module. The pump housing then is placed in a second machine assembly, the ball of the inlet ball check valve assembly is dropped into the pump housing and the first subassembly picks up a spring, which is slid over the inner end of the inner stem, to form a combined second subassembly. The second subassembly then is dropped into the housing and the locking sleeve is snap fit into the open end of the pump housing to form the final modular pump assembly, which may be separately shipped as discussed above. In a third machine, a gasket is placed over the pump module and a screw or other type of cap is snap fit onto the modular pump assembly to lock the parts in place. Thereafter, either a lotion nozzle or spray actuator is snapped onto the outer piston stem.

In addition to improved ease of assembly, the two part stem design also aids in the formation of radial flow inlets to a central stem passage leading to the actuator for dispensing product. Such inlets are formed by straight through molding of longitudinal slots in the outer stem. When the inner stem is placed over the inner end of the outer stem, these slots are transformed into radial inlets.

In addition to those features mentioned above, a particularly effective locking arrangement to prevent leakage also is provided. The piston abuts against the locking sleeve in the unactuated position to prevent leakage, even if the container is stepped upon by a consumer. The abutment of the piston against the locking sleeve is such that should the container be squeezed or stepped upon, the increased pressure applied in the pump chamber to the bottom of the piston simply increases the force by which an upper piston extension is held in place between the locking sleeve and pump chamber wall, thereby preventing leakage. Furthermore, the snap fit between the actuator and piston stem provides a positive connection, which allows pulling up of the piston stem assembly to further close the outlet valve and seal the piston extension to the locking sleeve, when the actuator is in its rotated, locked position.

The present invention also provides a lock for the actuator to prevent accidental dispensing. This is accomplished through rotation of the actuator relative to the locking sleeve to a detent position from which the actuator cannot be depressed. A further feature of the invention allows for repositioning of the actuator spout through rotation of the locking sleeve to effect a desired change in orientation by the ultimate end user or consumer. The top portion of the locking sleeve extending from the pump housing may be formed with longitudinal splines for gripping the locking sleeve to facilitate rotating it relative to the screw cap into the desired position against a controlled frictional surface provided on the locking sleeve. Even with this feature, the actuator may still be locked against accidental dispensing because the frictional force that must be overcome to rotate the actuator is much less than the frictional force that must overcome to rotate the locking sleeve relative to the screw cap.

Other features, advantages and embodiments of the invention are apparent from consideration of the following detailed description, drawings and appended claims.

DETAILED DESCRIPTION

Figure 1A:
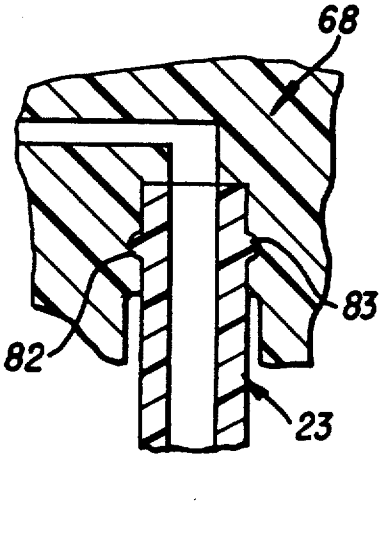
FIG. 1A is an enlarged cross sectional view of the connection between the actuator and the outer piston stem of the modular lotion pump of FIG. 1.
Figure 1:
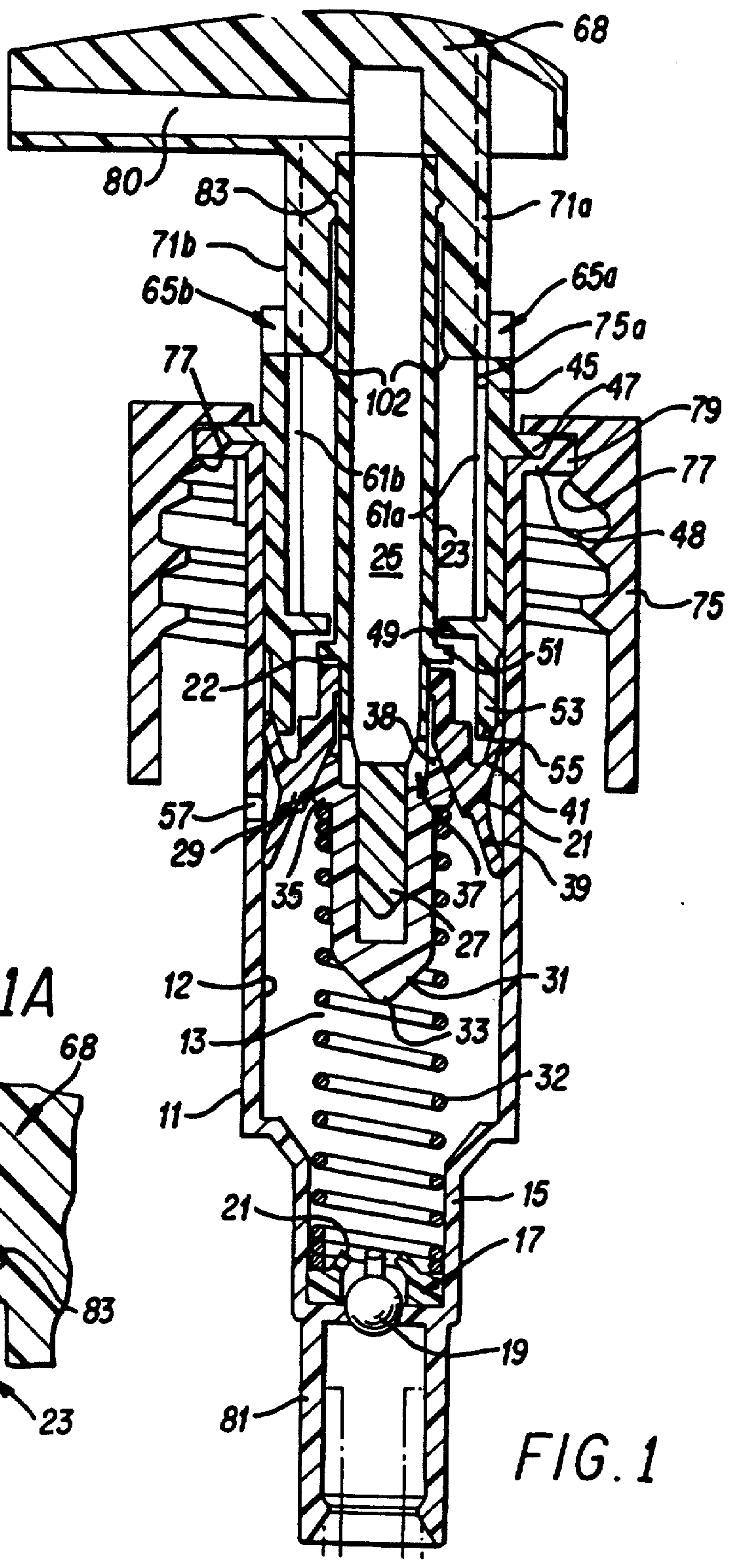
FIG. 1 is a longitudinal cross sectional view of a modular lotion pump constructed according to the principles the invention.

FIG. 1 is a longitudinal cross sectional view of a modular lotion pump constructed according to the present invention, which illustrates a cylindrical pump housing 11 having an inner wall 12 forming a boundary of pump chamber 13. At the inner end of housing 11, a small diameter section 15 receives a ball check valve assembly 17 comprising a, preferably, stainless steel ball 19 contained within a cage 21 into which the ball may be snapped. Instead of a separate cage, the ball may be retained between the bottom of housing 11, which forms a valve seat and the spring 32. This feature is discussed in more detail in connection with the description of FIG. 4 below. Within the chamber 13 a slidable piston 21 is supported for reciprocal motion therein. Extending through a central bore in piston 21 is an outer stem 23. Outer stem 23 is a hollow cylindrical member containing a central passage 25. At its inner end, outer stem 23 has a cylindrical portion 27 of reduced diameter. In the area where the diameter decreases, a plurality of longitudinal slots 29 are formed to provide openings into the central passage 25. The slots 29, along with a inner stem member 31, which is press fit over the inner end of the outer stem member 23, form radial inlets 37. By forming the radial inlets 37 to passage 25 in this manner, molding is simplified, slots 29 can be molded in a straight through mold; no radial pins are needed. Yet, when inner stem 31 is fitted in place, the required radial inlets are formed.

Inner stem 31 is a hollow cylindrical member having a conical portion 33 at its inner end and a radially extending flange 35 at its outer end from which a frustroconical hollow portion 38 extends upwardly. A spring 32 biases inner stem 31 outwardly such that portion 38 sealingly abuts against a correspondingly formed inner portion of piston 21 to form an outlet valve, which closes the inlets 37 in the position shown. The piston 21 has outwardly extending upper and lower extensions 41 and 39, respectively, which are in sealing contact with the inner wall 12 of the housing 11.

Locking sleeve 45 is located outwardly from the piston and extends in the housing 11 into abutment with the upper extension 41 of the piston. Locking sleeve 45 has a generally hollow, cylindrical shape. Near its outer end it has a radially outwardly extending flange 47, which rests on a radially outwardly extending flange 48 provided at the outer end of the housing 11. Near the inner end of the locking sleeve 45 is an inwardly extending flange 49. This flange 49 cooperates with, and acts as a stop for, the outer stem 23, which has a radially outwardly extending flange 51. The innermost end of the locking sleeve 45 contains a portion 53 of slightly reduced diameter, which at its very end contains a tapered surface 55 shown in sealing abutment with the upper extension 41 of the piston 21.

By virtue of this arrangement, the force of spring 32 and any pressure acting in the pump chamber underneath the piston simply pushes the piston against surface 55 to further lock the piston between locking member 45 and the wall 12 of the housing 11, thereby making a seal that tightens as more pressure is applied and ensuring that there is no leakage past the piston and out of the pump chamber through and around the stem. Even if the container on which the modular pump is mounted is stepped upon, fluid will not leak past the piston.

A vent opening 57 may be provided in the wall of the housing 11 for venting the container on which the modular pump is attached. The location of the vent intermediate the piston extensions in the unactuated position ensures that any fluid forced through the vent cannot get past the piston and leak out of the pump.

The locking sleeve 45 has two channel-like slots 61*a*, 61*b* cooperating with longitudinal projections 71*a*, 71*b*, respectively, to guide the pump actuator 68, which is snap fit on top of the outer stem 23, for inward and outward movement. Also shown in FIG. 1 is a cap 75, which snaps over the housing flange 48 as a projection 77 passes the flange 48. Flange 47 is trapped between inner cap surface 79 and projection 77, thereby resulting in a positive connection between cap 75 and the flange 47.

Figure 2:
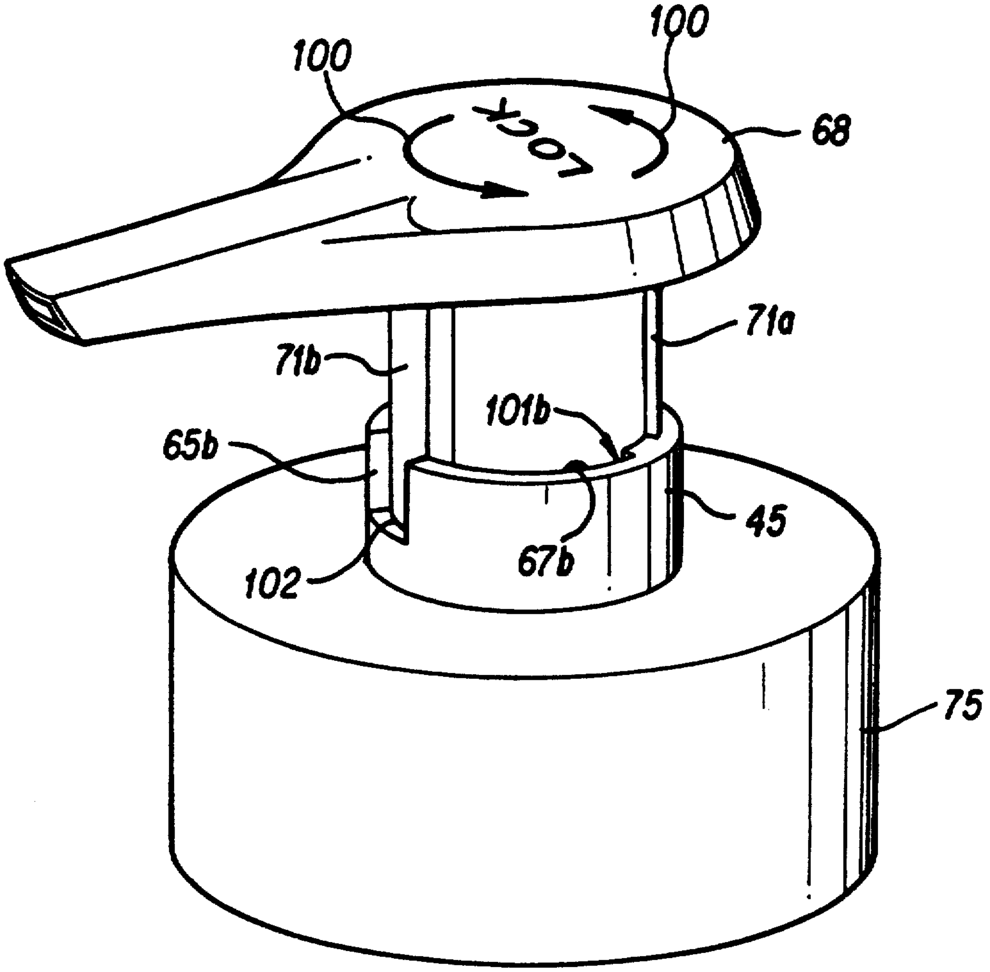
FIG. 2 is a perspective view of the cap, actuator and locking sleeve of the lotion pump of FIG. 1.
Figure 3:
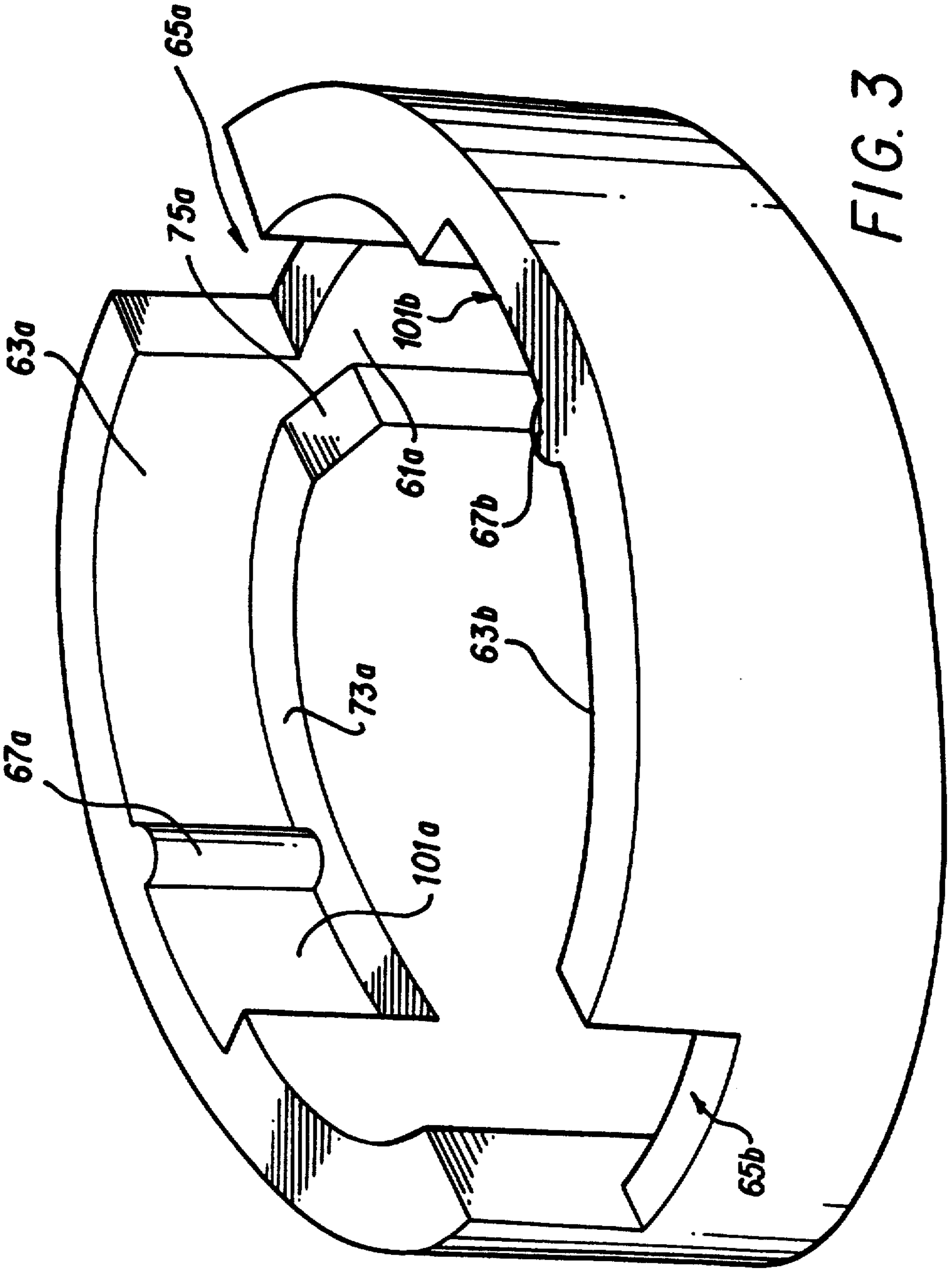
FIG. 3 is a perspective view of the top of the locking sleeve of FIG. 2.

FIG. 2 is a perspective view of the cap, actuator and locking sleeve of the lotion pump shown in cross section in FIG. 1, while FIG. 3 is a perspective view of the top of the locking sleeve 45. The actuator 68 mounted on top of the outer stem is shown in FIG. 2, as is the portion of the locking sleeve 45 that extends above the cap 75. As shown in FIGS. 1 and 3, cutaway portions 65*a*, 65*b* are disposed above slots 61*a*, 61*b*, respectively. Adjacent these cutaway portions are partially circumferentially extending slots 63*a*, 63*b* having formed in the wall thereof a respective stop or locking projection 67*a*, 67*b*. Slots 63*a*, 63*b* have larger inner diameters than the main portion of the sleeve 45 and extend longitudinally to bottom ledges 73*a*, 73*b*. The ends of ledges 73*a*, 73*b* adjacent cutaway portions 65*a*, 65*b* have sloped portions 75*a*, 75*b*, of which only sloped portion 75*a* is shown (FIG. 3). In the unactuated position shown in FIG. 1, circumferential slots 63*a*, 63*b* permit rotation of the actuator 68 such that the cooperating ribs 71*a*, 71*b*, which during actuation slide within respective slots 61*a*, 61*b*, may be rotated past sloped portions 75*a*, 75*b* and the locking projections 67*a*, 67*b* to the detent positions 101*a*, 101*b* where ledges 73*a*, 73*b* prevent inward movement. In this position, the actuator ribs 71*a*, 71*b* are not in alignment with slots 61a, 61b and the actuator cannot be depressed, thereby preventing accidental dispensing. The perspective view of FIG. 2, in which the actuator 68 is shown with the ribs 71a, 71b aligned with the cutaway portions 65a, 65b and, thus, with channels 61a and 61b, illustrates that rotation of the actuator relative to the locking sleeve 45 in the direction of arrows 100 will permit the ribs 71a, 71b to rotate in slots 63a, 63b to detent positions 101a, 101b. As discussed above, in this position the bottoms 102 (FIG. 1) of the ribs 71a, 71b abut ledge 73a, 73b to prevent inward motion of the actuator and accidental dispensing.

As shown in FIG. 1A, the actuator 68 is connected to the outer piston stem 23 by a projecting annular bead 83 which snaps into a groove 82 formed in an inner surface of the actuator. This provides a positive connection, which allows pulling up of the outer stem and, hence, inner stem when positioning the actuator in its rotated, locked position. Pulling up of the inner piston stem 31 further seals the inner stem portion 38 to the piston 21 and further seals the piston 21 to the locking sleeve 45, in addition to the sealing action that occurs due to the force of spring 32.

The cap, pump housing, locking sleeve, piston, piston stems and actuator of the invention may be formed from plastic or other suitable materials.

In operation, with the actuator 68 disposed in the position shown in FIGS. 1 and 2, as the actuator 68 is pressed inwardly, the ribs 71a, 71b are guided for movement in the slots 61a, 61b. As the actuator is depressed, the stem 23, 31 moves inwardly against the biasing force of return spring 32. After the stem moves a short distance, the outlet valve, which is formed between the outer surface of the frusto-conical portion 38 of the inner stem 31 and the corresponding inner surface of the piston 21, is opened to establish communication between the radial inlets 37 and the pump chamber 13. Subsequently, the flange 51 contacts the top 22 of the piston 21 and carries the piston inwardly with the stem. As the piston moves inwardly, it forces the fluid material within the chamber 13 though the inlets 37 into the passage 25 to be dispensed via a passage 80 in the actuator 68. Once the piston has passed the vent 57, air is free to flow into the container. The air flow path is around the actuator and into the inside of the locking member 45, due to the clearance therebetween, and then through the gap between the flange 49 and the outer stem 23 and to the vent 57. During the inward stroke of the piston, the inlet ball valve 19 is seated, of course, due to the pressure in chamber 13. On the return stroke, as the piston moves outwardly, the ball is lifted from its seat and the pump chamber refills by virtue of the pressure differential between the pump chamber and container. The portion 81 of the housing below the ball check valve assembly 17 is of reduced diameter and a dip tube 88 is received therein. The dip tube extends to the bottom of the container for conducting fluid to the check valve assembly 17.

FIGS. 4–7 illustrate another embodiment of a modular lotion pump constructed according to the principles of the invention. In FIGS. 4–7 parts constructed similarly to those discussed in connection with FIGS. 1–3 are designated with the same reference numeral followed by a prime. As the operation of both illustrated embodiments is basically the same, only the major differences from the FIG. 1–3 embodiment, i.e., the inlet ball check valve assembly 17', the locking sleeve 45' and the venting of the container via grooves 43, are discussed in detail below.

Figure 4:
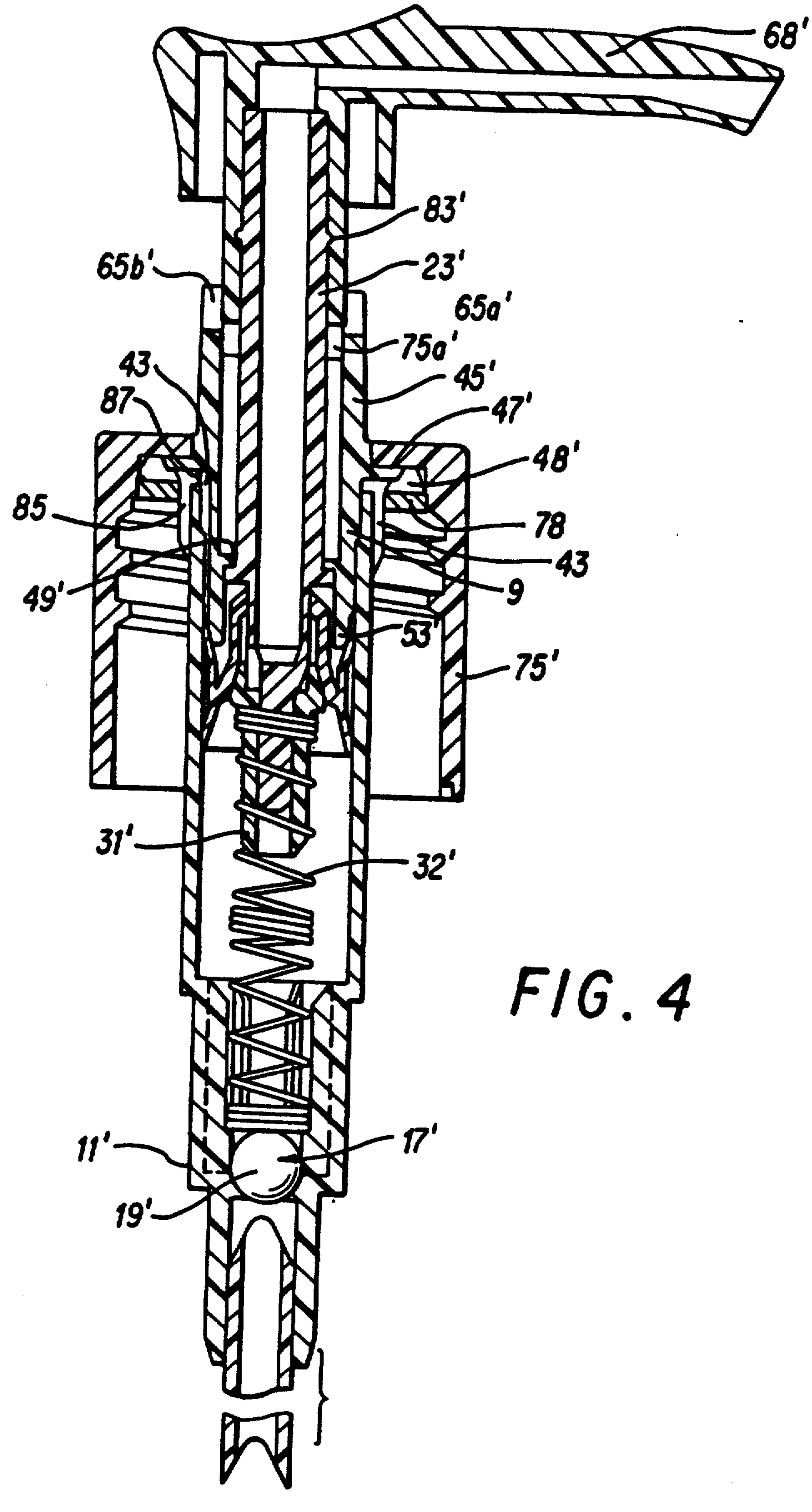
FIG. 4 is a longitudinal cross sectional view of another embodiment of a modular lotion pump of the invention.
Figure 5:
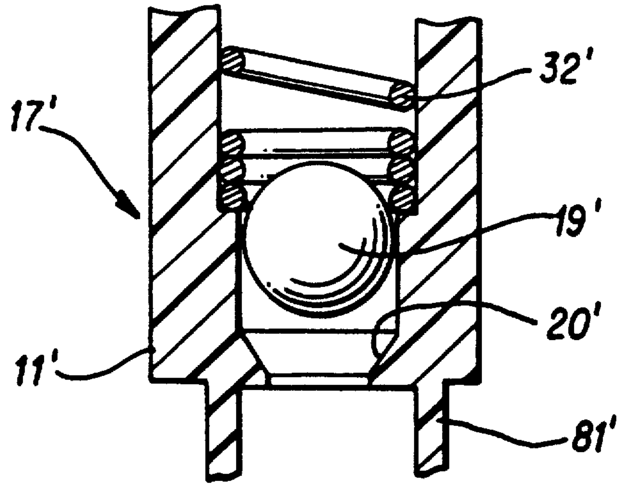
FIG. 5 is an enlarged cross sectional view of the inlet ball check valve assembly of FIG. 4 in which the integral pump housing and valve seat is illustrated.

The inlet ball check valve assembly 17' of FIG. 4 comprises a ball 19' and a valve housing that is integrally formed with the pump housing 11'. As shown best in FIG. 5, pump housing 11' is formed with a frusto-conically shaped valve seat 20' with which ball 19' mates to prevent flow into the pump chamber as the piston is depressed. The travel of the ball in the other, flow permitting, direction is restricted by the inner diameter of spring 32', which is smaller than the outer diameter of the ball.

Figure 6:
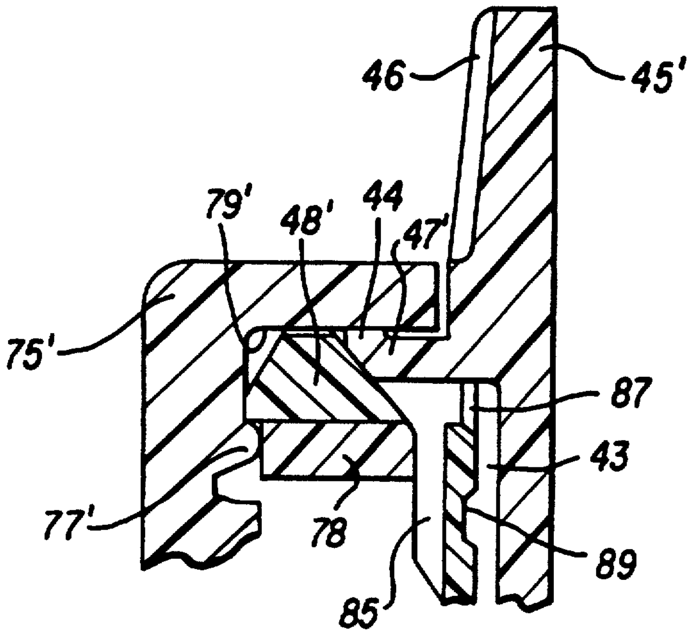
FIG. 6 is an enlarged cross sectional view of the connection between the locking sleeve and the screw cap of FIG. 4.
Figure 7:
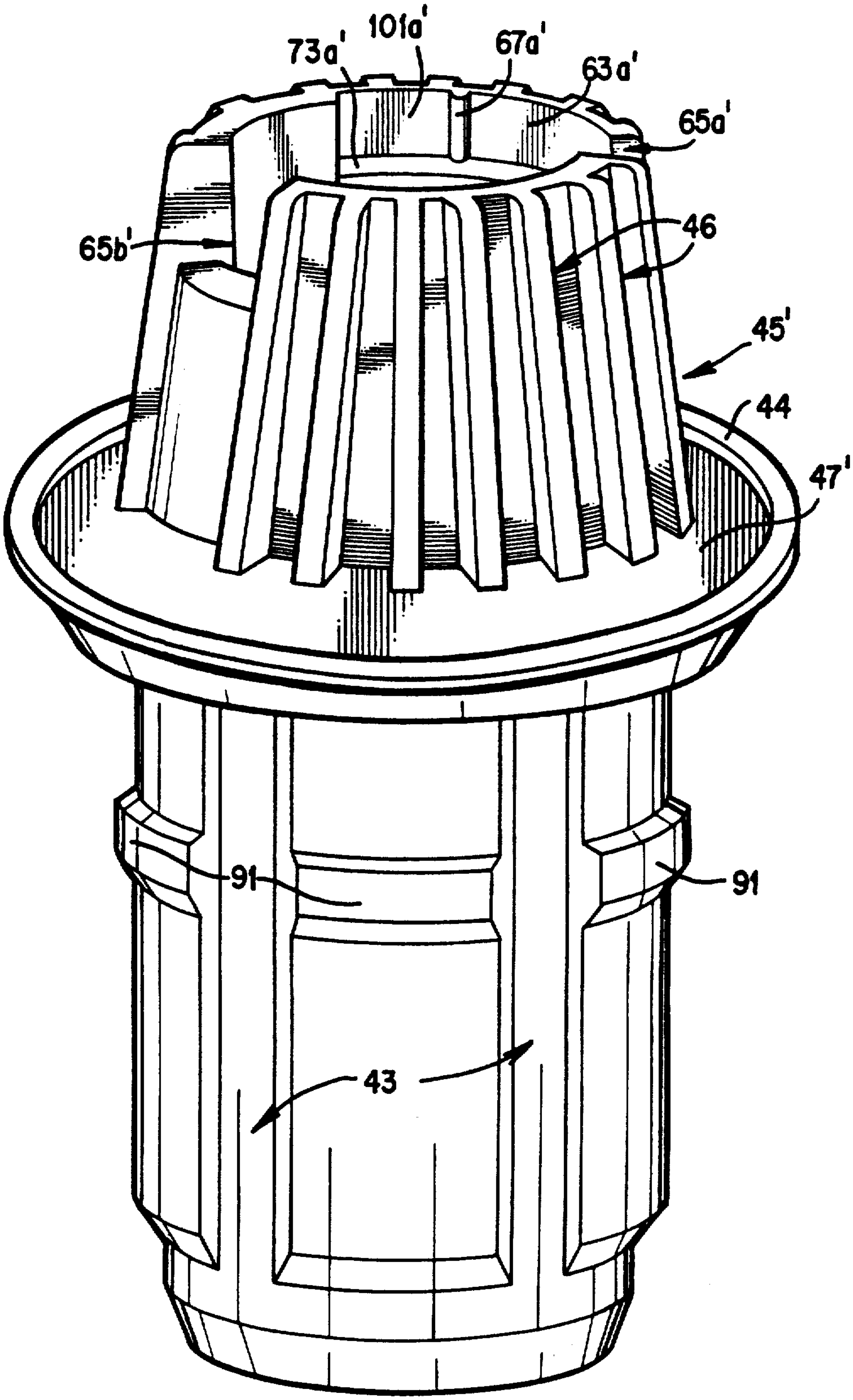
FIG. 7 is a perspective view of the locking sleeve of FIG. 4.

A further difference in this embodiment lies in the locking sleeve 45', which is best shown in the perspective view of FIG. 7. Locking sleeve 45' contains all of the slots and grooves discussed above in connection with the FIG. 1–3 embodiment for guiding and locking the actuator against accidental dispensing, in addition to several other features. The first feature is an annular surface 44, which upwardly projects from the radially outward most portion of flange 47'. As shown in FIG. 6, surface 44 acts against the undersurface 79' of the housing cap 75' to provide a controlled frictional force, which must be overcome before the locking sleeve 45' may be rotated relative to housing cap 75'. To facilitate gripping of locking sleeve 45' to produce the relative rotation, splines 46 are provided in the upper peripheral surface of the locking sleeve that extends out of the housing cap 75'. With this arrangement, should the consumer or ultimate user desire to reposition the axial direction of the spout of actuator 68', the screw cap 75' is held in place while the splines 46 are gripped and rotated relative to housing cap 75' to move the actuator 68' into a desired position against the controlled frictional force. The actuator 68' can still be locked to prevent accidental dispensing because the frictional force required to rotate the actuator is much less than the controlled frictional force required to rotate the locking sleeve relative to the screw cap.

Another feature of locking sleeve 45' is the provision of vent grooves 43, four of which may be provided, although only two are shown in FIG. 7. These grooves cooperate with two opposed slots 85 formed in the housing (shown in FIGS. 4 and 6) via an annular vent path 87 formed between the inner diameter of the housing 11' and the outer diameter of the locking sleeve 45' to vent the container in a manner similar to the venting described in connection with the FIG. 1–3 embodiment. In the FIG. 4–7 embodiment, once the upper piston extension moves away from the end of the locking sleeve, air is free to flow into the container via a flow path that is more circuitous than the flow path of the FIG. 1–3 embodiment. In a manner similar to the FIG. 1–3 embodiment, the first portion of the air flow path is around the actuator 68', into the inside of the locking member 45', and then through the gap between the flange 49' and the outer stem 23'. However, instead of flowing through a vent hole in the container, in this embodiment the air then flows around the bottom 53' of the locking sleeve between the gap bridging the outer diameter of the locking sleeve and the inner diameter of the housing (which is no longer sealed by the piston), up the vent grooves 43 to annular vent path 87 (FIG. 6), through the housing slots 85 and into the container to replenish it with air. This arrangement is preferable to the vent hole 57 because it obviates the leakage that would occur in a vent hole arrangement were the container turned upside-down. However, in some instances, e.g., when a viscous material is dispensed, this may not be a concern and the vent hole may be used.

Figure 8:
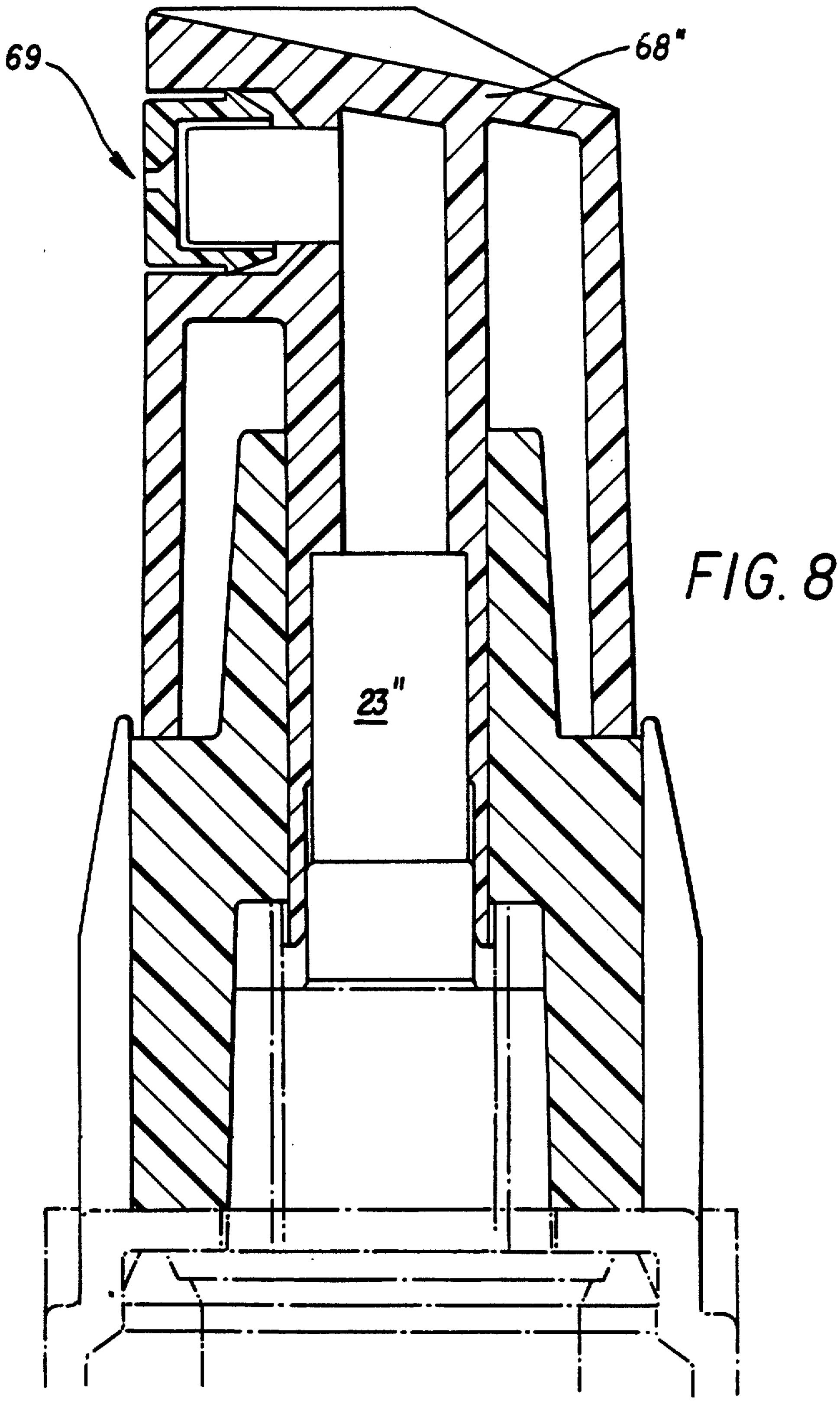
FIG. 8 is a cross sectional view of the top of a modular lotion pump of the invention fitted with a spray actuator.

One particular advantage of the FIG. 4–7 embodiment is the ease with which the modular lotion pump may be automatically assembled. In a first assembly machine, the outer piston stem 23' is inserted in a central opening in the piston and the inner piston stem 31' is pressed onto the inner end of the outer stem to hold the piston in place and form a first subassembly or module. Next, the housing is placed in a second assembly machine, the ball 19' is dropped into the housing 11', the first subassembly picks up spring 32', which is slid over the inner end of the inner stem, and this combined second assembly is dropped into the housing. Thereafter, the locking sleeve 45' is snapped into the pump housing 11', via a discontinuous annular bead 91, which is received in groove 89 formed in an inner surface of the pump housing 11' to form the final modular pump assembly. (The FIG. 1–3 embodiment also employs a bead-groove type of connection, although it is not illustrated.) In a third machine, a gasket 78 is placed over the module and screw cap 75' is snap fit onto the modular pump to lock the parts in place, in a manner previously discussed in connection with FIGS. 1–3. A lotion nozzle or actuator, such as 68' shown in FIG. 4, or a spray actuator, such as 68" shown in FIG. 8 is snap fit at 83' onto the outer piston stem. The spray actuator 68' of FIG. 8 employs a break-up insert 69 to produce a spray upon dispensing in a manner known in the art.

The lotion pump of the invention has several advantages over the pumps heretofore known in the art. One advantage of the present invention is the modular construction, which includes the locking sleeve being inserted into the pump chamber and held therein by groove and interlocking bead connection that holds the other parts of the pump together. This permits using the basic modular pump assembly with different types of caps or covers other than the screw-type cap 75 shown. Also, the modular pump assembly may be shipped separately as modules such that the purchaser or customer could then assemble the cap, actuator and dip tube to the modular pump assembly.

Another particular advantage of the invention lies in the ease of manufacture of the pump due to the manner in which the two piece stem is constructed. The slots 29, which provide an inlet into passageway 25, are longitudinal slots and, thus, are extremely easy to mold. In effect, the two piece construction transforms the molded longitudinal slots 29 into horizontal side slots or radial inlets 37 leading into the passage 25.

A further advantage concerns the extension 41 of the piston being wedged between the locking sleeve 45 and the wall 12 of the pump chamber, which as previously noted provides a particularly effective seal. As the pressure within the pump chamber 13 increases, the effectiveness of this seal arrangement increases.

Another advantage is the rotatable locking sleeve, which permits reorientation of the actuator during filling or use by the consumer. The dual slots 61*a* and 61*b* in the locking sleeve provide an advantageous construction for guiding the actuator, which decreases the likelihood of tilting and jamming of the actuator. Furthermore, the use of circumferential slots 63*a*, 63*b* and cooperating ribs 71*a*, 71*b* provide a simple, yet effective way to prevent accidental dispensing.

Various modifications can be made to the lotion pump of the present invention and the features of the two embodiments discussed above may be interchanged. With respect to the FIG. 1–3 embodiment, in particular, the vent opening 57 can be provided at a different location, such as at a position disposed above the piston in its unactuated position. However, the location of the vent opening shown in FIG. 1 intermediate the piston is preferable for the reasons previously discussed. The use of the optional, separate ball cage described in the FIG. 1–3 embodiment also provides numerous advantages both in molding and assembly. The separate ball cage obviates the need for the ball valve housing to be molded into the pump housing. The seat and other tolerances associated with the ball valve can be better formed in the small, separate, ball cage. Furthermore, the ball cage can be made of a different, e.g., softer material, than the pump housing. Furthermore, in each of the described embodiments, the distance between flange 51 and the top 22 of the piston 21 can be increased, and a spring inserted therebetween. With such an arrangement, upon actuation the additional spring must first be compressed, thereby building up a pre-pressure. Only after a predetermined amount of pre-pressure in the spring, does the piston begin to move inwardly to open the inlet valve and permit communication with inlets 37. This spring pre-pressurization arrangement provides for smoother dispensing under a higher pressure, which avoids streaming of the material dispensed. Such an arrangement is disclosed, for example, in FIG. 27 of U.S. Pat. No. 4,113,145, the disclosure of which is incorporated herein.

What is claimed is:

1. A modular pump for dispensing material from a container comprising:

a pump housing having a pump chamber therein;

a piston slidably supported for reciprocal motion in the pump chamber, said piston having a central opening therein;

an outer stem having a first portion of predetermined diameter and a second portion disposed inwardly of said first portion, said second portion having a smaller diameter than said predetermined diameter, said first portion extending through said central opening in the piston and including a radially outwardly extending flange for moving said piston inwardly in the pump chamber;

an inner stem having a hollow portion press fit onto said second portion, said inner stem having a radially outwardly extending flange for abutting a surface of said piston to form therewith an outlet valve for the pump chamber;

an axial passage formed in said outer stem;

at least one inlet disposed downstream of said outlet valve leading into the axial passageway;

a check valve disposed at one end of the pump chamber forming an inlet valve therefor;

a rotatable locking sleeve supported for rotation within the other end of the pump chamber;

a spring biasing said inner stem outwardly to an unactuated position in which the inner stem flange abuts the piston surface to close the outlet valve, said outer stem flange is spaced from the piston, and said piston abuts an inner end of the locking sleeve to seal said pump chamber;

an actuator mounted on said outer stem for moving said out stem inwardly against the bias of said spring to actuate the pump to an operative position in which the outer stem moves relative to said piston to open said outlet valve and abut the piston whereafter the outer stem moves the piston inwardly for pressurizing said pump chamber;

at least one slot formed on an inner surface of said locking sleeve;

at least one cooperating rib formed on an outer surface of said actuator, said at least one rib being received in said at least one slot for guiding the actuator as it is depressed to actuate the modular pump;

at least one partially circumferentially extending slot disposed adjacent said at least one slot and having a ledge formed at a depth adjacent a bottom edge of said at least one rib when said actuator is in a fully outwardly biased position; and at least one stop projecting radially inward at a remote end of said at least one circumferentially extending slot whereby the actuator may be rotated relative to the locking sleeve until said at least one rib passes said at least one stop and is retained in a detent position in which said ledge prevents inward movement of the actuator and the locking sleeve may be rotated relative to said pump housing to reposition the orientation of the actuator.

2. The modular pump of claim 1 wherein said at least one slot comprises first and second diametrically opposed longitudinal slots formed on the inner surface of said locking sleeve, and said at least one cooperating rib comprises first and second cooperating ribs formed on the outer surface of said actuator, said first and second ribs being received in said first and second slots, respectively.

3. The modular pump of claim 2 wherein said pump housing has a radial flange extending outwardly from its outer end, said locking sleeve has a radial flange extending outwardly from an intermediate portion of the locking sleeve, and the flange of said locking sleeve rests upon on the flange of said pump housing.

4. The modular pump of claim 3 wherein said locking sleeve has a bead projecting from an outer surface thereof, said pump housing has a correspondingly shaped recess formed in an inner surface thereof receiving said bead to axially connect said locking sleeve to said pump housing and permit relative rotation therebetween.

5. The modular pump of claim 4 further comprising a cap having means for attachment to a container from which material is to be dispensed, said cap including a projection and an inner surface spaced therefrom between which said locking sleeve flange and said housing flange are trapped when said cap is snap fit onto the modular pump.

6. The modular pump of claim 5 wherein said locking sleeve flange includes an annular surface abutting against the inner surface of the cap for producing a frictional force therebetween as the locking sleeve is rotated relative to the housing to change the position of the actuator, said frictional force being greater than that required to rotate the actuator relative to the locking sleeve.

7. The modular pump of claim 6 wherein said at least one partially circumferentially extending slot comprises first and second partially circumferentially extending slots disposed adjacent said first and second longitudinal slots, respectively, said circumferentially extending slots having respective ledges formed at a depth adjacent respective bottom edges of said ribs when said actuator is fully outwardly biased and said at least one stop comprises stops projecting radially inward at remote ends of said circumferentially extending slots.

8. The modular pump of claim 1 wherein said piston includes an upper extension and said inner end of said locking sleeve comprises a portion of reduced diameter spaced from a wall of said pump chamber, said upper extension of said piston resting between the wall of said pump chamber and said reduced portion when the piston is biased outwardly to the unactuated position by said spring whereby any additional pressure in said pump chamber causes said piston to more tightly lock between said locking sleeve and said pump chamber wall to prevent leakage.

9. The modular pump of claim 8 wherein said actuator has an annular groove and said outer stem has an corresponding annular bead projecting radially outward, said bead being received in said recess such that outward force on said actuator, pulls said outer stem outwardly to more tightly close the outlet valve and more tightly lock the upper piston extension between the locking sleeve and pump chamber wall.

10. The modular pump of claim 9 wherein said actuator includes a dispensing passage in communication with said axial passage for dispensing material from the modular pump.

11. The modular pump of claim 1 wherein said check valve comprises a ball check valve assembly including a ball received in a valve housing, and said one said end of the pump chamber is its inner end.

12. The modular pump of claim 11 wherein said valve is integrally formed in said one end of the pump chamber and includes a valve seat shaped to mate with the ball to close the check valve.

13. The modular pump of claim 12 wherein said spring is disposed between said inner stem and said ball check valve assembly and has an inner diameter smaller than the outer diameter of said ball to retain the ball within the valve housing when the ball moves away from the valve seat to permit flow into the pump chamber.

14. The modular pump of claim 12 wherein said spring is disposed between said inner stem and said ball check valve assembly, said ball check valve assembly including a cage formed as a separate unit from said pump housing to retain the ball within the valve housing when the ball moves away from the valve seat to permit flow into the pump chamber.

15. The modular pump of claim 1 wherein said ar least one inlet comprises at least one radial passageway formed by at least one longitudinal slot in the outer stem disposed in a region of said outer stem located between said first and second portions, and an outer end of said inner stem.

16. The modular pump of claim 15 wherein said at least one inlet comprises two radial passageways formed by diametrically opposed longitudinal slots in the outer stem disposed in a region of said outer stem located between said first and second portions, and an outer end of said inner stem.

17. The modular pump of claim 1 wherein said locking sleeve includes an outer portion projecting from the other end of the pump chamber, said outer portion including at least one longitudinal spline for rotating said locking sleeve relative to said pump housing.

18. A modular pump for dispensing material from a container comprising:

a pump housing having a pump chamber therein;

a piston slidably supported for reciprocal motion in the pump chamber, said piston having a central opening therein;

an outer stem having a first portion of predetermined diameter and a second portion disposed inwardly of said first portion, said second portion having a smaller diameter than said predetermined diameter, said first portion extending through said central opening in the piston and including a radially outwardly extending flange for moving said piston inwardly in the pump chamber;

an inner stem having a hollow portion press fit onto said second portion, said inner stem having a radially outwardly extending flange for abutting a surface of said piston to form therewith an outlet valve for the pump chamber;

an axial passage formed in said outer stem;

at least one inlet disposed downstream of said outlet valve leading into the axial passageway;

a check valve disposed at one end of the pump chamber forming an inlet valve therefor;

a locking sleeve received within the other end of the pump chamber;

a spring biasing said inner stem outwardly to an unactuated position in which the inner stem flange abuts the piston surface to close the outlet valve, said outer stem flange is spaced from the piston, and said piston abuts an inner end of the locking sleeve to seal said pump chamber;

an actuator mounted on said outer stem for moving said outer stem inwardly against the bias of said spring to actuate the pump to an operative position in which the outer stem moves relative to said piston to open said outlet valve and abut the piston whereafter the outer stem moves the piston inwardly for pressurizing said pump chamber;

at least one groove provided in an outer surface of said locking sleeve;

at least one slot formed in the pump housing so as to be in communication with material to be dispensed from a container upon which the modular pump is mounted;

an annular vent passage formed between the pump housing and the locking sleeve connecting said at least one groove with said at least one slot; and means for providing an air flow path between atmosphere and said at least one groove upon inward movement of the piston.

19. A modular pump for dispensing material from a container comprising:

means for enclosing a pump chamber;

means for pressurizing said pump chamber, said pressurizing means being slidably supported for reciprocal motion in the pump chamber and having a central opening therein;

an outer stem having a first portion of predetermined diameter and a second portion disposed inwardly of said first portion, said second portion having a smaller diameter than said predetermined diameter, said first portion extending through said central opening in said pressurizing means and including means for moving said pressurizing means inwardly in the pump chamber;

an inner stem having a hollow portion press fit onto the second portion, said inner stem having a radially outwardly extending flange for abutting a surface of said pressurizing means to form therewith means for selectively permitting the flow of material from the pump chamber;

means formed in said outer stem for conducting material to be dispensed;

at least one inlet disposed downstream of the flow permitting means leading into the material conducting means;

means disposed at one end of said pump chamber for selectively permitting flow into the pump chamber;

a rotatable locking sleeve received within the other end of the pump chamber;

means for biasing the inner stem outwardly to an unactuated position in which the inner stem flange abuts the pressurizing means surface to close the means for permitting flow from the pump chamber, said means for inwardly moving the pressurizing means is spaced from the pressurizing means and said pressurizing means abuts an inner end of the locking sleeve to seal the pump chamber;

means for moving the outer stem inwardly against the bias of said biasing means to actuate the pump to an operative position in which the outer stem moves relative to said pressurizing means to open said means for permitting flow from said pump chamber until said means for moving said pressurizing means inwardly abuts said pressurizing means whereafter said pressurizing means moves inwardly for pressurizing said pump chamber;

means for guiding said means for moving the outer stem inwardly for rotational movement relative to said locking sleeve, said guiding means preventing inward movement of said means for moving the outer stem inwardly in at least one relative rotational position of said outer stem moving means and said locking means; and means supporting the locking sleeve for rotation relative to said enclosing means to change the orientation of said outer stem moving means.

* * * * *